(12) United States Patent
Makino et al.

(10) Patent No.: US 11,171,554 B2
(45) Date of Patent: Nov. 9, 2021

(54) STEPPING MOTOR

(71) Applicant: AISAN KOGYO KABUSHIKI KAISHA, Obu (JP)

(72) Inventors: Katsuhiko Makino, Aichi-ken (JP); Shinji Murai, Obu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 146 days.

(21) Appl. No.: 16/424,628

(22) Filed: May 29, 2019

(65) Prior Publication Data

US 2019/0379264 A1 Dec. 12, 2019

(30) Foreign Application Priority Data

Jun. 6, 2018 (JP) .............................. JP2018-108261

(51) Int. Cl.
| | |
|---|---|
| *H02K 1/14* | (2006.01) |
| *H02K 3/32* | (2006.01) |
| *H02K 37/14* | (2006.01) |
| *H02K 37/22* | (2006.01) |
| *H02K 3/52* | (2006.01) |
| *H02K 37/16* | (2006.01) |

(52) U.S. Cl.
CPC ............. *H02K 37/22* (2013.01); *H02K 1/143* (2013.01); *H02K 1/145* (2013.01); *H02K 3/325* (2013.01); *H02K 3/521* (2013.01); *H02K 37/14* (2013.01); *H02K 37/16* (2013.01); *H02K 2203/12* (2013.01)

(58) Field of Classification Search
CPC ........ H02K 37/16; H02K 37/22; H02K 1/145; H02K 5/225
See application file for complete search history.

(56) References Cited

U.S. PATENT DOCUMENTS 4,107,559 A * 8/1978 Patel .................... H02K 5/1672
310/194
6,046,519 A * 4/2000 Hanazumi .............. H02K 1/145
310/257

(Continued)

FOREIGN PATENT DOCUMENTS

| JP | 08103064 A | * 4/1996 |
| JP | H08103064 A | 4/1996 |

(Continued)

OTHER PUBLICATIONS

Hyodo, Machine Translation of JP08103064, Apr. 1996 (Year: 1996).*

(Continued)

*Primary Examiner* — Quyen P Leung
*Assistant Examiner* — Eric Johnson
(74) *Attorney, Agent, or Firm* — Conley Rose, P.C.

(57) ABSTRACT

A stepping motor includes a stator, a rotor rotatably supported by the stator, and an auxiliary magnetic member. The auxiliary magnetic member has a body, side edge parts at both circumferential ends of the body, and an opening between the side edge parts. The auxiliary magnetic member is elastically mounted around a flange of the stator. The auxiliary magnetic member includes, at one of the side edge parts, a projecting part protruding radially inward from a projected inner circumferential surface of the body across the opening.

20 Claims, 7 Drawing Sheets

(56) References Cited

U.S. PATENT DOCUMENTS

| | | | |
|---|---|---|---|
| 7,692,355 B2* | 4/2010 | Ihle | H02K 15/14 |
| | | | 310/257 |
| 7,765,674 B2 | 8/2010 | Nakano et al. | |
| 2008/0054764 A1* | 3/2008 | Katada | H02K 1/145 |
| | | | 310/49.01 |
| 2019/0372421 A1 | 12/2019 | Amaya et al. | |
| 2021/0126505 A1 | 4/2021 | Amaya et al. | |

FOREIGN PATENT DOCUMENTS

| | | |
|---|---|---|
| JP | H10108448 A | 4/1998 |
| JP | 2002218728 A | 8/2002 |
| JP | 2004312821 A | 11/2004 |
| JP | 2006158083 A | 6/2006 |
| JP | 2009081960 A | 4/2009 |
| WO | 2018097167 A | 5/2018 |

OTHER PUBLICATIONS

Japanese Office Action dated Jun. 15, 2021, for Japanese Application No. 2018-108261 (4 p.).
English Translation of Japanese Office Action dated Jun. 15, 2021, for Japanese Application No. 2018-108261 (4 p.).

\* cited by examiner

STEPPING MOTOR

CROSS-REFERENCE TO RELATED APPLICATIONS

This application claims priority to Japanese patent application serial number 2018-108261, filed Jun. 6, 2018, and entitled "Stepping Motor," which is hereby incorporated herein by reference in its entirety for all purposes.

STATEMENT REGARDING FEDERALLY SPONSORED RESEARCH OR DEVELOPMENT

Not applicable.

BACKGROUND

This disclosure relates generally to stepping motors, more specifically, stepping motors with an auxiliary magnetic member.

One type of stepping motor is a claw pole type stepping motor. A claw pole type stepping motor has a stator and a rotor. The stator includes a bobbin. The bobbin is provided with yokes and is wound by coils. The rotor has a rotor shaft and magnets. The rotor shaft is rotatably supported by the stator. The magnets are attached to the rotor shaft and arranged such that N-poles and S-poles of the magnets are alternately aligned in a circumferential direction of the rotor. The stator has ring-shaped flanges, each having an outer diameter larger than those of the coils. The stator has an auxiliary magnetic member formed in a substantially hollow cylindrical shape. The flanges of the stator are fitted into the auxiliary magnetic member.

One kind of the auxiliary magnetic member is made of a magnetic plate rolled to have a C-shaped cross-section so as to be elastically mounted around the flanges of the stator. The auxiliary magnetic member having the C-shaped cross-section has an opening between a pair of side edge parts. The opening extends in an axial direction of the auxiliary magnetic member. The side edge parts face each other across the opening.

BRIEF SUMMARY

In one aspect of this disclosure, a stepping motor includes a stator, a rotor, and an auxiliary magnetic member. The stator includes a bobbin, a coil winding around the bobbin, and a flange formed in a ring shape having the outer diameter larger than that of the coil. The bobbin is provided with a yoke. The rotor includes a rotor shaft rotatably supported by the stator and magnets arranged around the rotor shaft. N-poles and S-poles of the magnets are alternately aligned in a circumferential direction of the rotor. The auxiliary magnetic member is made of a magnetic plate and has a body, side edge parts at both circumferential ends of the body, and an opening between the side edge parts. The side edge parts face each other across the opening. The auxiliary magnetic member is elastically mounted around the flange of the stator. The auxiliary magnetic member includes, at one of the side edge parts, a projecting part protruding radially inward from a projected inner circumferential surface extended along an inner circumferential surface of the body across the opening.

According to this aspect, the projecting part of the auxiliary magnetic member elastically abuts on the flange of the stator in a state where the auxiliary magnetic member is elastically mounted around the flange of the stator. Therefore, the noise caused by the auxiliary magnetic member when intermittently supplying the power to the coil is decreased.

In another aspect of this disclosure, a stepping motor includes a stator, a rotor, an auxiliary magnetic member, and an intervening member. The stator includes a bobbin, a coil winding around the bobbin, and a flange formed in a ring shape having the outer diameter larger than that of the coil. The bobbin is provided with a yoke. The rotor includes a rotor shaft rotatably supported by the stator and magnets arranged around the rotor shaft. The auxiliary magnetic member is made of a magnetic plate and has a body, opening edge parts at both circumferential ends of the body, and an opening between the opening edge parts. The opening edge parts face each other across the opening. The auxiliary magnetic member is elastically mounted around the flange of the stator. The intervening member is interposed between one of the opening edge parts and the flange of the stator.

According to this aspect, the intervening member can inhibit the corresponding opening edge part from coming into direct contact with the flange of the stator. Thus, noise caused by the auxiliary magnetic member when intermittently supplying the power to the coil is decreased.

According to another aspect of the disclosure, a stepping motor comprises a stator having a first flange, an auxiliary magnetic member mounted around the first flange, and a projection. The auxiliary magnetic member has a body with a projected inner circumferential surface. The projection is connected to the body of the auxiliary magnetic member. At least a portion of the projection is positioned radially inward from the projected inner circumferential surface of the body.

According to this aspect, the portion of the projection positioned radially inward from the projected inner circumferential surface of the body reduces noise caused by the auxiliary magnetic member when intermittently supplying the power to the stepping motor.

Other objects, features and advantage of the present teaching will be readily understood after reading the following detailed description together with the accompanying drawings and the claims.

BRIEF DESCRIPTION OF THE DRAWINGS

For a detailed description of the preferred embodiments of the present teaching, reference will now be made to the accompanying drawings.

DETAILED DESCRIPTION

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different people may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to. . . . " Also, the term "couple" or "couples" is intended to mean either an indirect or direct connection. Thus, if a first device couples to a second device, that connection may be through a direct connection, or through an indirect connection via other devices, components, and connections.

Each of the additional features and teachings disclosed above and below may be utilized separately or in conjunction with other features and teachings to provide improved stepping motors. Representative examples of the present teachings, which examples utilized many of these additional features and teachings both separately and in conjunction with one another, will now be described in detail with reference to the attached drawings. This detailed description is merely intended to teach a person skilled in the art further details for practicing preferred aspects of the present teachings and is not intended to limit the scope of the claimed subject-matter. Only the claims define the scope of the claimed subject-matter. Therefore, combinations of features and steps disclosed in the following detailed description may not be necessary to practice the claimed subject-matter in the broadest sense, and are instead taught merely to particularly describe representative examples of the present teachings. Moreover, various features of the representative examples and the dependent claims may be combined in ways that are not specifically enumerated in order to provide additional useful embodiments of the present teachings.

As previously described, one kind of the auxiliary magnetic member has a C-shaped cross-section and is elastically mounted about the flanges of the stator. Sometimes, a space may arise between the side edge parts and the flanges of the stator due to manufacture tolerances, manufacturing errors, or the like. In such cases, when supplying power to the coils, the side edge parts may come into contact with the flanges of the stator in response to electromagnetic attracting forces, and when the power supply to the coils is stopped, the side edge parts move away from the flanges due to elastic restoring forces. Thus, when repeatedly turning on/off the supply of power to the coils, the side edge parts may slightly vibrate and generate noise due to contact with the flanges. Accordingly, embodiments described herein are directed to devices and methods for reducing noise resulting from contact between the side edge parts of auxiliary magnetic members and the flanges.

Figure 1:
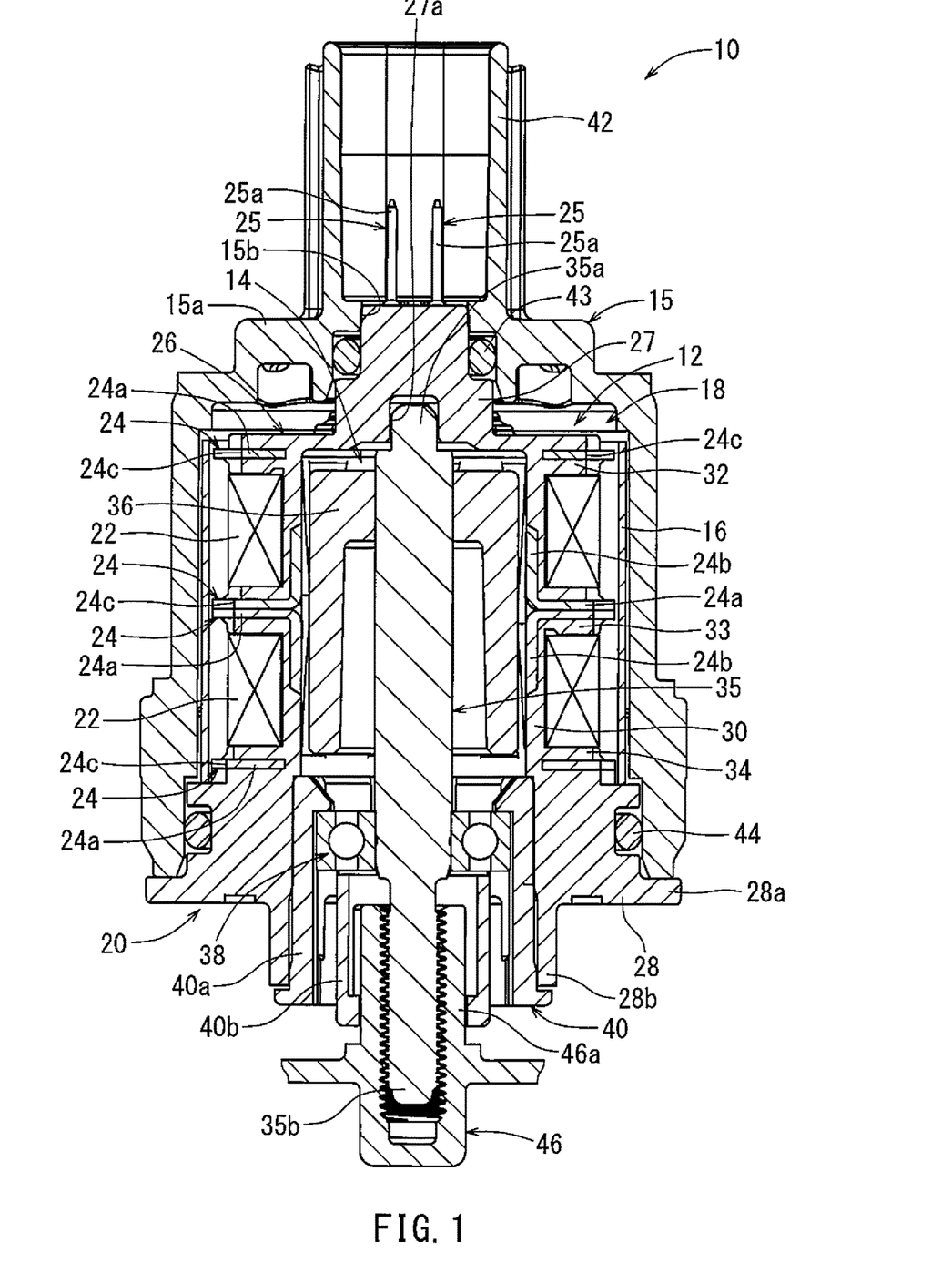
FIG. 1 is a cross-sectional view of a stepping motor according to a first embodiment.

Referring now to FIG. 1, a first embodiment of a stepping motor 10 is shown. In this embodiment, the stepping motor 10 is configured for use as an actuator of a flow control valve. For the purposes of clarity and further explanation, upper, lower, right, and left directions are based on the orientation of the stepping motor 10 shown in FIG. 1. However, these directions are not intended to limit the installation orientation or direction of the stepping motor 10.

As shown in FIG. 1, the stepping motor 10 includes a stator 12, a rotor 14, and a cover 15. The stator 12 is fitted into an auxiliary magnetic member. In this embodiment, the auxiliary magnetic member comprises a stator plate 16 that is rolled to have a generally C-shaped cross-section. The stator 12 and the stator plate 16 form a stator assembly 18.

Figure 4:
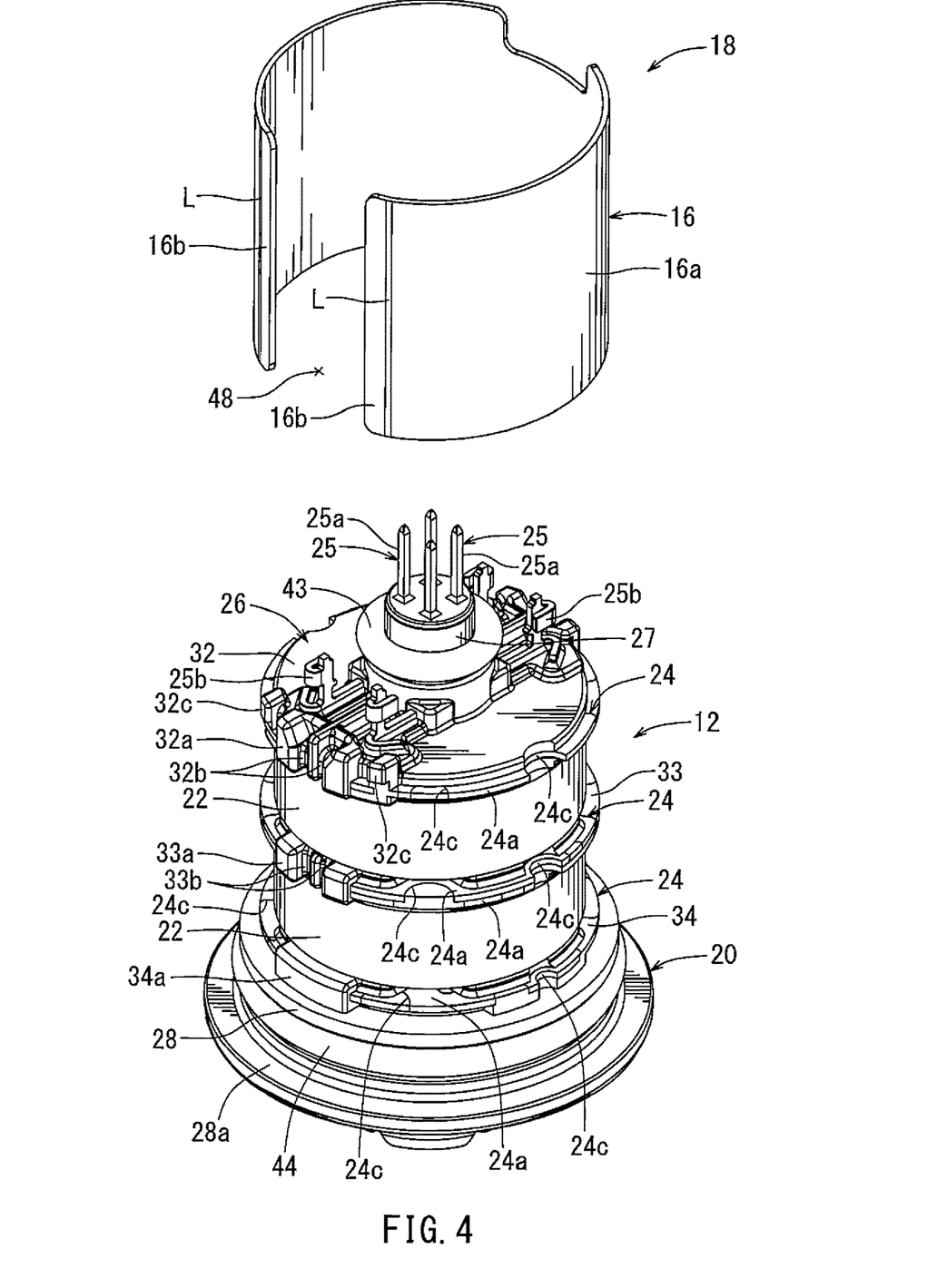
FIG. 4 is a perspective view of the stator assembly of FIG. 2 in a disassembled state.

As shown in FIGS. 1 and 4, the stator 12 has a bobbin 20 and coils 22. The bobbin 20 is made from a resin material and is formed by integrating four yokes 24 and four terminals 25 with each other by insert molding. The bobbin 20 includes a bobbin body 26, an upper support 27, and a lower support 28. The bobbin body 26 has a cylindrical part 30, an upper flange 32, a middle flange 33, and a lower flange 34. The cylindrical part 30 has a substantial hollow cylindrical shape. Each of the upper flange 32, the middle flange 33, and the lower flange 34 is formed in an annular, ring shape extending radially outward from the cylindrical part 30.

As shown in FIG. 4, the upper flange 32 includes a guide projection 32a, which is formed in an arc shape protruding radially outward. Plural (e.g., two) guide grooves 32b, which are configured to guide the coil wires of the coils 22, are formed in parallel with each other at an upper surface of the upper flange 32 and a side surface of the guide projection 32a. The upper flange 32 includes a pair of stoppers 32c at an upper end of the upper flange 32. The stoppers 32c project radially outward. The stoppers 32c are disposed on opposite circumferential sides of the guide projection 32a, such that there is a predetermined interval between each of the stoppers 32c and the guide projection 32a.

The middle flange 33 has a guide projection 33a, which is formed in an arc shape protruding radially outward. Plural (e.g., two) guide grooves 33b, which are configured to guide the coil wire of the coils 22, are formed in parallel with each other at a side surface of the guide projection 33a. The lower flange 34 has a guide projection 34a formed in an arc shape protruding radially outward. The guide projections 32a, 33a, 34a are formed to have substantially the same outer diameter as each other in the plan view.

As shown in FIG. 1, the upper support 27 is formed in a stepped cylindrical shape above the cylindrical part 30 such that the upper support 27 closes an upper end of the cylindrical part 30. The upper support 27 has a counterbore or receptacle 27a at a central portion of the lower surface thereof. The lower support 28 is formed in an annular, ring shape at a lower end of the bobbin body 26. The lower support 28 has an outer diameter larger than that of the stator plate 16. The lower support 28 has an attachment flange 28a extending radially outward from a lower end thereof. The lower support 28 includes a sleeve 28b formed in a hollow cylindrical shape. The sleeve 28b extends from an inner circumferential edge of the lower surface of the lower support 28 in the axial direction (downward in FIG. 1).

As the four yokes 24 have substantially the same shape, the structure of only one of the yokes 24 will be described it being understood the other yokes 24 have the same shape. In this embodiment, the yoke 24 is made of a metal plate, such as an iron plate, and is shaped by press-molding. The yoke 24 includes a basal plate 24a and a plurality (e.g. six) of magnetic pole teeth 24b extending radially from the basal plate 24a. The basal plate 24a is formed in a substantially annular plate shape. Each of the magnetic pole teeth 24b has a substantially annular plate shape. The magnetic pole teeth 24b are formed by press-molding such that the magnetic pole teeth 24b extend from an inner circumferential edge of the basal plate 24a at approximately right angles. As shown in FIG. 4, the basal plate 24a includes a plurality of circumferentially-spaced concave recesses 24c extending radially inward from an outer circumferential portion thereof.

The four yokes 24 are divided into two pairs. Each pair of yokes 24 are arranged such that the magnetic pole teeth 24b mesh with each other. Further, the two pairs of yokes 24 are concentrically stacked in the vertical direction. As shown in FIG. 1, the basal plate 24a of the yoke 24 disposed at the highest position is disposed in the upper flange 32. The basal plate 24a of the yoke 24 disposed at the lowest position is disposed in the lower flange 34. The basal plates 24a of the two yokes 24 adjacent to each other and disposed in the middle between the uppermost basal plate 24a and the lowermost basal plate 24a are buried in the middle flange 33. As shown in FIG. 4, the outer circumferential portions of the basal plates 24a of the yokes 24 and some of the concave recesses 24c are exposed from the flanges 32, 33, 34, except at positions where the guide projections 32a, 33a, 34a are provided.

Each flange 32, 33, 34 includes a flange portion. The flange portions of the flanges 32, 33, 34 are concentrically formed in a substantial circle shape so as to basically have the same outer diameter, referred to as "flange outer diameter." The flanges 32, 33, 34 have a flange outer diameter that is larger than the outer diameter of the coils 22.

Figure 3:
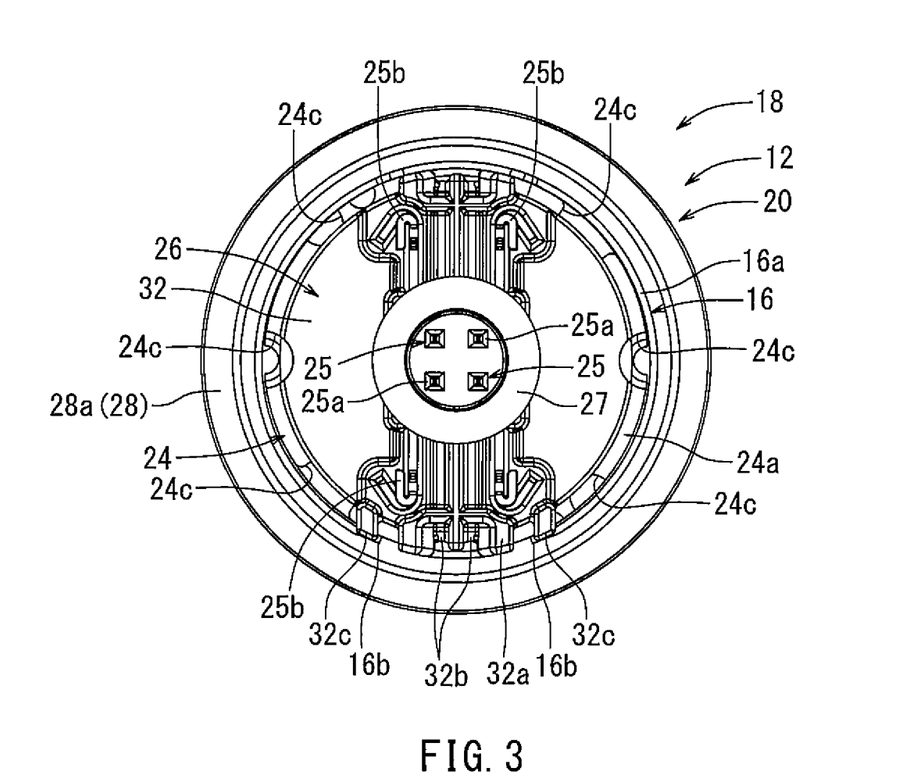
FIG. 3 is a plan, end view of the stator assembly of FIG. 2.

As the four terminals 25 have substantially the same shape, the structure of only one of the terminals 25 will be described it being understood the other terminals 25 have the same shape. In this embodiment, the terminal 25 is made of a metal plate, such as an iron plate, and is shaped by press-molding. The terminal 25 has a basal end (lower end in FIG. 1) disposed in the upper support 27. As shown in FIG. 4, the terminal 25 includes a pin part 25a and a coil connection part 25b. The pin part 25a projects upward from the top surface of the upper cylindrical part of the upper support 27. The coil connection part 25b is exposed from the upper surface of the bobbin body 26. The four terminals 25 are divided into two pairs. Each pair of terminals 25 is arranged parallel to each other and symmetrically aligned in left/right direction. Further, the two pairs of terminals 25 are disposed symmetrically in the front/rear direction. As shown in FIG. 3, the pin parts 25a are uniformly circumferentially-spaced on the upper cylindrical part of the upper support 27.

The coils 22 wind around the cylindrical part 30 in spaces between the upper flange 32 and the middle flange 33 and between the middle flange 33 and the lower flange 34. The coil wires (not shown) of the coils 22 are engaged with the guide grooves 32b of the upper flange 32 and the guide grooves 33b of the middle flange 33. Ends of the coil wires are connected to corresponding coil connection parts 25b of the terminals 25.

As shown in FIG. 1, the rotor 14 includes a rotor shaft 35 and magnets 36 mounted to the rotor shaft 35. The rotor shaft 35 is made from metal, such as stainless steel. The rotor shaft 35 has a small diameter shaft part 35a at an upper end thereof and a threaded shaft part 35b at a lower end thereof. The magnets 36 are attached to the upper portion of the rotor shaft 35. Each of the magnets 36 may be a permanent magnet. The magnets 36 are magnetized such that their N-poles and S-poles alternately arranged on the outer circumferential surface of the rotor 14. That is, the magnets 36 are arranged around the rotor shaft 35 such that N-poles and S-poles of the magnets 36 are alternately aligned in the circumferential direction of the rotor 14. The number of the N-poles and the number of S-poles corresponds to the number of the magnetic pole teeth 24b of each yoke 24 of the stator 12.

A central portion of the rotor shaft 35 is rotatably supported by a retainer 40 via a bearing 38. In this embodiment, the bearing 38 is a ball bearing. The retainer 40 is made from a resin material. The retainer 40 has an outer cylindrical part 40a and an inner cylindrical part 40b. Each of the outer cylindrical part 40a and the inner cylindrical part 40b is formed in a hollow cylindrical shape. The inner cylindrical part 40b is positioned in the outer cylindrical part 40a to form a double cylinder structure. The bearing 38 is disposed in an upper portion of the outer cylindrical part 40a.

The rotor 14 is disposed in the stator 12. The small diameter shaft part 35a of the rotor shaft 35 is rotatably supported in the receptacle 27a of the stator 12. The outer cylindrical part 40a is fitted into the lower support 28 of the stator 12 by press fitting from below. As a result, the rotor 14 is rotatably housed in the stator 12.

The threaded shaft part 35b of the rotor shaft 35 is coupled to a movable member. In this embodiment, the movable member is a valve member 46. The valve member 46 is made from a resin material. The valve member 46 includes a connection cylindrical part 46a formed in a hollow cylindrical shape. The connection cylindrical part 46a is threadedly engaged with the threaded shaft part 35b. The connection cylindrical part 46a is fitted into the inner cylindrical part 40b of the retainer 40, such that the connection cylindrical part 46a can move in the axial direction, i.e., the vertical direction in FIG. 1, and is prevented from rotating about its axis.

The cover 15 is made from a resin material. The cover 15 is formed in a hollow stepped cylindrical shape. The cover 15 has an upper wall part 15a and a fitting hole 15b extending vertically through a central portion of the upper wall part 15a. The upper wall part 15a is provided with a connector 42 that is formed in a hollow cylindrical shape extending upward from the upper wall part 15a. The cover 15 houses the stator assembly 18 therein. The upper cylindrical part of the upper support 27 of the stator 12 is fitted into the fitting hole 15b. An O-ring 43 is disposed between the cover 15 and the upper cylindrical part of the upper support 27. The lower support 28 of the stator 12 is fitted into an opening in the lower end of the cover 15. An O-ring 44 is provided between the cover 15 and the lower support 28. A lower end surface of the cover 15 abuts the attachment flange 28a of the stator 12.

The stepping motor 10 is installed in a passage forming member (not shown). The connector 42 is connected with an external connector linked to a controller that is configured to control the stepping motor 10. Thus, the stepping motor 10 is controlled by the controller to rotate the rotor shaft 35 in the forward and reverse directions. When the rotor shaft 35 is rotated in the forward or reverse direction, the valve member 46 moves upward or downward in the axial direction, depending on the rotational direction of the rotor shaft 35. Consequently, the valve member 46 opens and closes a flow passage formed by the passage forming member to control the amount of fluid flowing through the flow passage.

Figure 5:
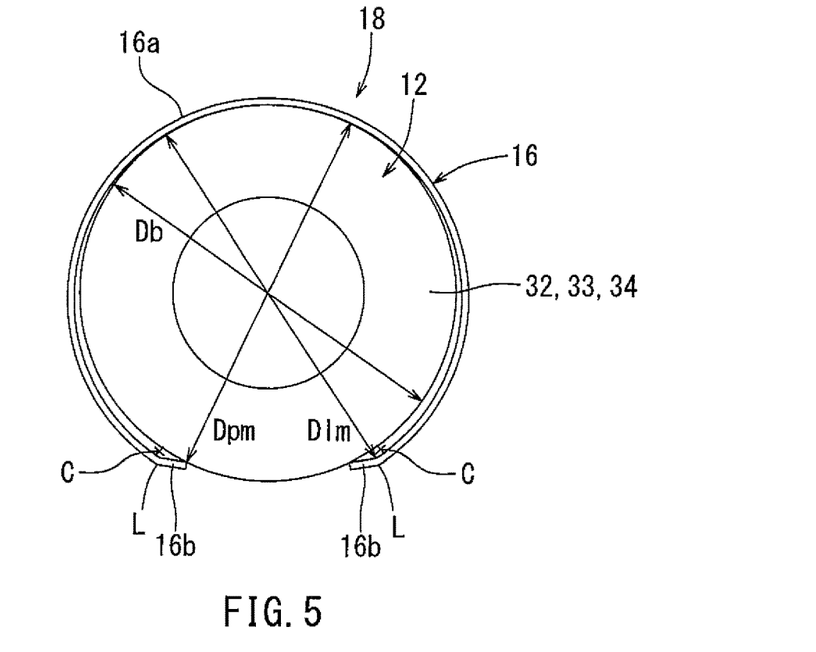
FIG. 5 is a schematic end view of the stator plate and flanges of the stator of FIG. 2 illustrating a positional relationship between the stator plate and the flanges.

FIG. 5 schematically shows a positional relationship between the stator plate 16 and each of the flanges 32, 33, 34 of the stator 12. As shown in FIG. 5, each flange 32, 33, 34 of the stator 12 has the same predetermined flange outer diameter Db.

Figure 6:
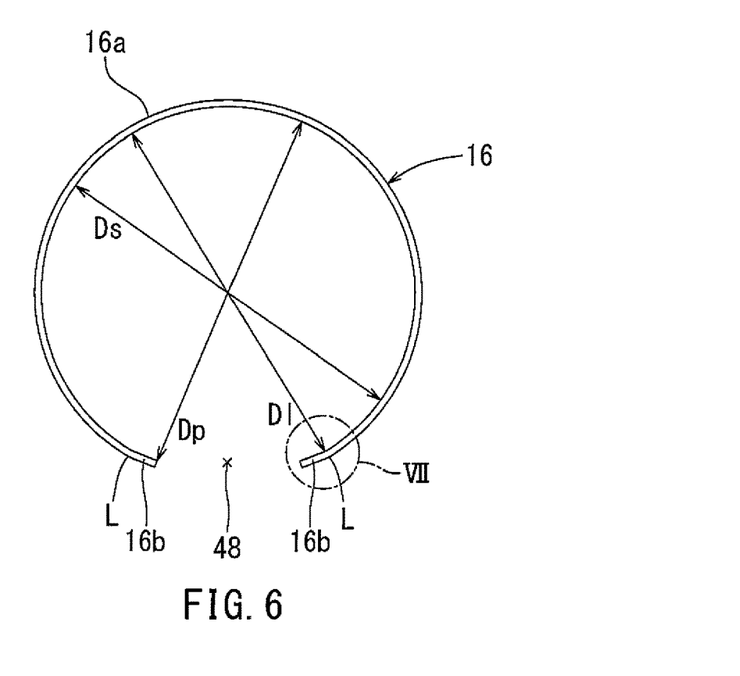
FIG. 6 is a plan, end view of the stator plate of FIG. 5.

As shown in FIG. 6, the auxiliary magnetic member may include a body and one or more projections attached to the body. In this embodiment, the stator plate 16 is formed in a shape substantially having a C-shaped cross-section. The stator plate 16 may be shaped by rolling a magnetic plate by press-molding or the like. The stator plate 16 has a plate body 16*a*, side edge parts 16*b*, and an opening 48. The plate body 16*a* corresponds to a main body of the stator plate 16. The side edge parts 16*b* are formed at both circumferential ends of the plate body 16*a* and are formed as projections attached to the main body in this embodiment. The opening 48 extends linearly in the axial direction of the stator plate 16. The opening 48 is positioned between the side edge parts 16*b* such that the side edge parts 16*b* essentially face each other across the opening 48. The plate body 16*a* is formed to have a circular arc shaped (e.g., C-shaped) cross-section when the stator plate 16 is disassembled. The plate body 16*a* has an inner diameter Ds. The inner diameter Ds in the disassembled state may be slightly smaller than the flange outer diameter Db (see FIG. 5) of each flange 32, 33, 34 of the stator 12. As noted above, in this embodiment, the stator plate 16 corresponds to the auxiliary magnetic member. In this embodiment, the plate body 16*a* corresponds to the body of the auxiliary magnetic member.

Figure 7:
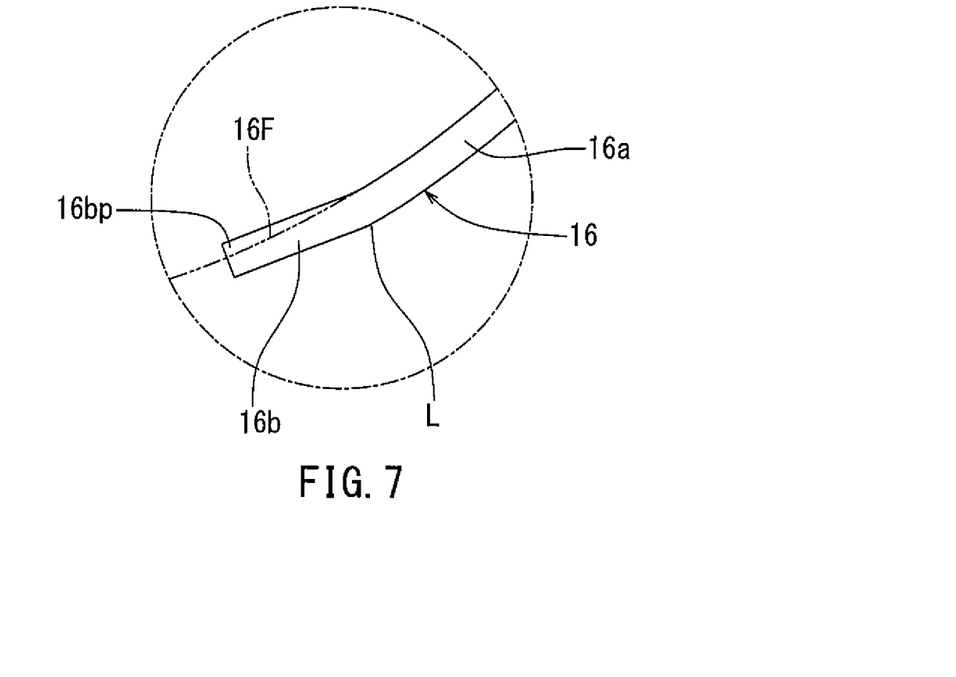
FIG. 7 is an enlarged view of the stator plate of FIG. 6 taken in section VII of FIG. 6.

Each of the side edge parts 16*b* of the stator plate 16 is bent radially inward relative to the plate body 16*a*, for example by press-molding, along a corresponding linear bending line L that extends in the axial direction. Thus, as shown in FIG. 7, each of the side edge parts 16*b* has a radially inward portion that is positioned radially inward from a projected inner circumferential surface 16F of the plate body 16*a*. The projected inner circumferential surface 16F is drawn by extending the inner circumferential surface of the plate body 16*a* of the stator plate 16 across the opening 48. In this embodiment, the radially inward portion of the side edge part 16*b* is depicted as the projecting part 16*bp* positioned radially inward (upward in FIG. 7) of the projected inner circumferential surface 16F. The projecting parts 16*bp* of the side edge parts 16*b* linearly extend in the axial direction of the stator plate 16. The projecting parts 16*bp* also extend in essentially a circumferential direction from the linear bending line L towards the opening 48. Based on a bending angle about the linear bending line L and the relative length of the portion of the stator plate 16 that comprises the side edge part 16*b*, the thickness of the projecting part 16*bp* in a radial direction (upward in FIG. 7) may gradually increase from the linear bending line L to the opening 48.

Figure 2:
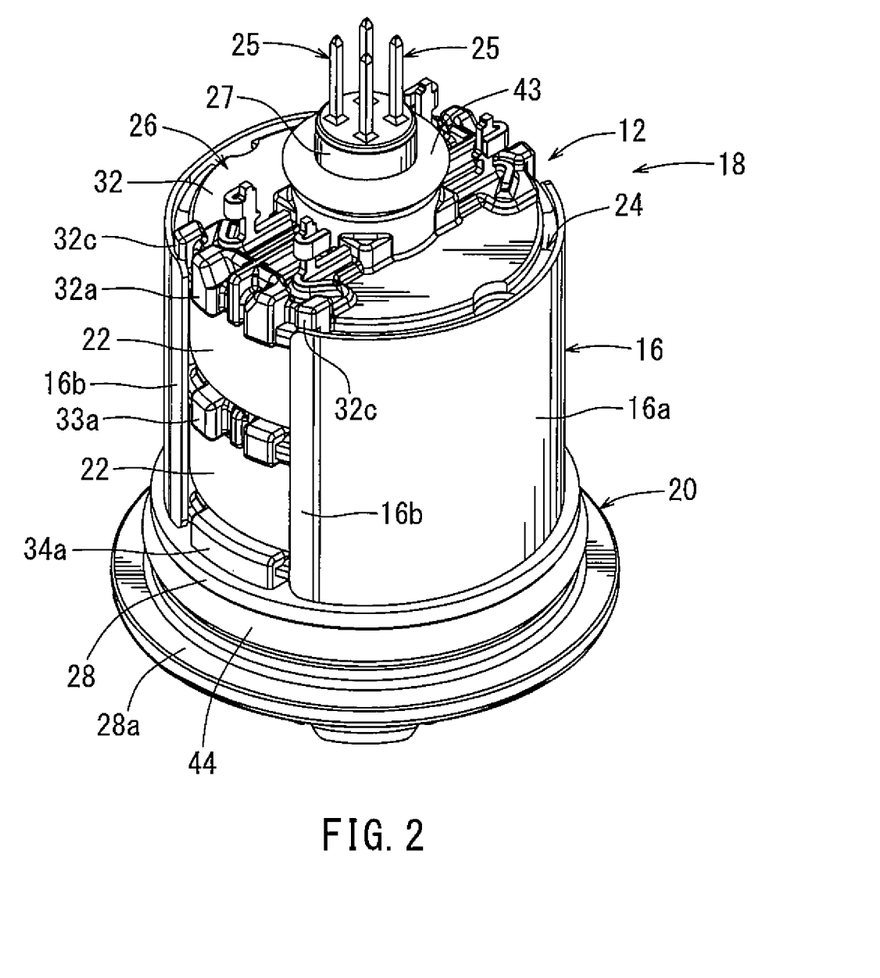
FIG. 2 is a perspective view of a stator assembly of the stepping motor of FIG. 1.

The flanges 32, 33, 34 of the stator 12 are fitted into the stator plate 16 due to elastic deformation of the stator plate 16. As shown in FIG. 2, the stator plate 16 is positioned such that the guide projections 32*a*, 33*a*, 34*a* of the flanges 32, 33, 34 are between the side edge parts 16*b* and in the opening 48 of the stator plate 16.

As shown in FIG. 5, in a state where the flanges 32, 33, 34 of the stator 12 are fitted in the stator plate 16, the radially inward portion of the side edge part 16*b* abut the outer circumferential surface of the flanges 32, 33, 34. In this state, there are gaps or spaces C between the flanges 32, 33, 34 of the stator 12 and portions of the stator plate 16.

For example, when the stator plate 16 is fitted around the stator 12, the stator plate 16 elastically deforms to accommodate the size the flange outer diameter Db. As the projecting part inner diameter Dp is smaller than the flange outer diameter Db in the disassembled state, the stator plate 16 is elastically deformed when mating with the flanges 32, 33, 34. More specifically, the diameter (e.g., cross-sectional length) of the stator plate 16 between the projecting part 16*bp* and a portion of the body 16*a* directly across the projecting part 16*b* in the disassembled state is the projecting part inner diameter Dp. When mating, the stator plate 16 is elastically deformed such that diameter (e.g., cross-sectional length) between projecting end part 16*bp* and the body 16*a* is increased to a size corresponding to a mated projecting part inner diameter Dpm. In the mated state, the mated projecting part inner diameter Dpm of the stator plate 16 has essentially the same diameter as the flange outer diameter Db and a larger diameter than the projecting part inner diameter Dp (which is the diameter in the disassembled state).

In some versions of the first embodiment, the space C between the stator 12 and the flanges 32, 33, 34 in the mated state may be the largest at the linear bending line L. For example, the stator plate 16 may abut the stator 12 at a portion corresponding to each of the projecting end parts 16*bp* and a portion of the body plate 16 opposite the opening 48. From the portion of the stator plate 16 opposite the opening 48 towards the linear bending line L in the circumferential direction, the size of the space C in the radial direction may gradually increase. From the linear bending line L towards the projecting end part 16*bp* in the circumferential direction, the radial size of the space C may decrease. In some versions, the rate of size increase of the space C per unit length between the portion of the stator plate 16 opposite the opening 48 and the linear bending line L in the circumferential direction may be less than the rate of size decrease of the space C per unit length between the linear bending line L and the projecting end part 16*bp* in the circumferential direction.

Additionally, the diameter (e.g. cross-sectional length) of the stator plate 16 between the linear bending line L and a portion of the body 16*a* opposite the linear bending line L may be the largest diameter of the stator plate 16 when the stator plate 16 is mated with the flanges 32, 33, 34. That is, the largest diameter of the stator plate 16 in the mated state may be the mated linear bending line inner diameter Dlm. Accordingly, the mated linear bending line inner diameter Dlm may be larger than both the flange outer diameter Db and the mated projecting end part inner diameter Dpm. However, in the disassembled state, the diameter (e.g., cross-sectional length) of the stator plate 16*a* between the linear bending line L and a portion of the body 16*a* opposite the linear bending line L, depicted as the linear bending line inner diameter Dl in FIG. 6, is approximately the same as the inner diameter Ds of the body 16*a*. Accordingly, the linear bending line inner diameter Dl may be slightly smaller than flange outer diameter Db.

As shown in FIG. 2, the guide projections 32*a*, 33*a*, 34*a* are positioned between the side edge parts 16*b* of the stator plate 16 in the circumferential direction. A lower end surface of the stator plate 16 abuts an upper surface of the lower support 28 of the stator 12. Upper end surfaces of the side edge parts 16*b* abut or are adjacent to lower surfaces of a pair of stopper 32*c* of the upper flange 32. Thus, the stator plate 16 is generally positioned in the axial direction, i.e., the vertical direction.

According to the stepping motor 10 described above, in the state where the flanges 32, 33, 34 of the stator 12 are fitted in the stator plate 16, the side edge parts 16*b* of the stator plate 16 elastically abut the flanges 32, 33, 34 of the stator 12. Thus, the stator plate 16 is prevented from generating noise when cycling the supply of the power to the coils 22. Further, potential dimensional errors due to manufacturing tolerances, or the like, between the flanges 32, 33, 34 of the stator 12 and the stator plate 16 do not cause any problems. Accordingly, the dimensional accuracy required for manufacturing the flanges 32, 33, 34 and the stator plate 16 can be decreased. Thus, dimensional control of the flanges 32, 33, 34 and the stator plate 16 can be simplified and costs reduced.

The side edge parts 16b can be easily formed by obliquely bending end portions of the stator plate 16 radially inward along the bending lines L.

The minimum value of the bending amount of the side edge parts 16b, e.g., the inward projection amount of projecting parts 16bp from the projected inner circumferential surface 16F of the plate body 16a of the stator plate 16, is set as the variable A. The maximum value of the difference between the largest flange outer diameter Db and the smallest flange outer diameter Db of the flanges 32, 33, 34, which may be caused by manufacturing error or the like, is set as the variable B. The minimum value of A is set to be equal to or larger than the maximum value of B. Due to this configuration, the volume of the spaces C between the stator plate 16 and the flanges 32, 33, 34 of the stator 12 can be decreased, while still accommodating the manufacturing errors or the like. Thus, a decrease in the thrust of motor caused by the spaces C is decreased.

Figure 8:
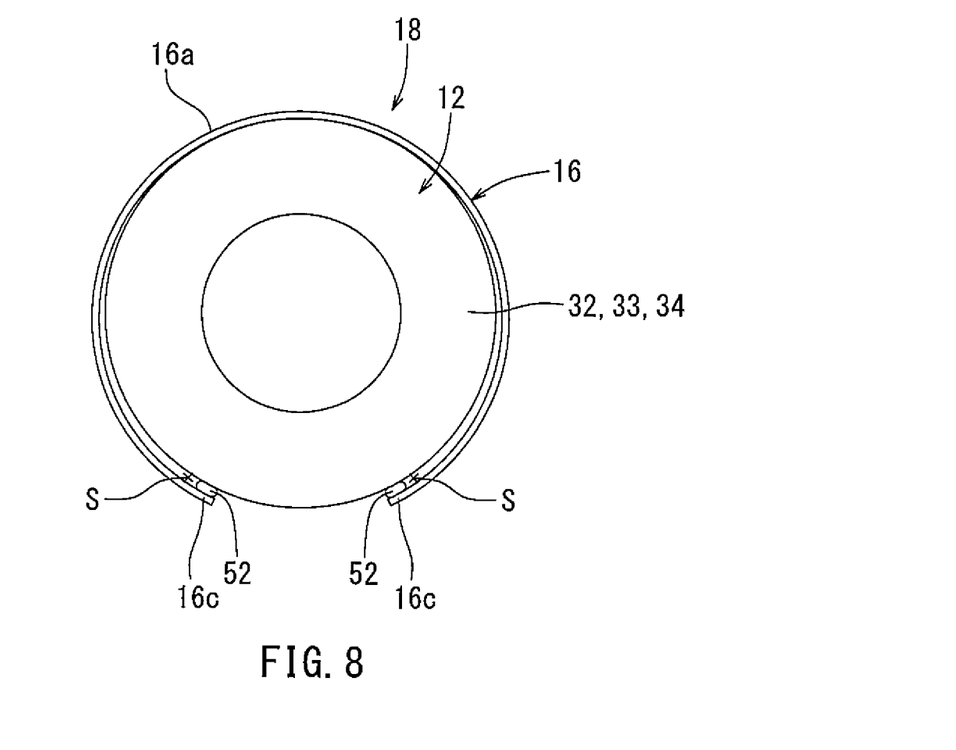
FIG. 8 is a schematic end view illustrating the positional relationship between the stator plate and the flanges of a stator according to a second embodiment.

A second embodiment will be described. The second embodiment corresponds to the first embodiment with some changes. Thus, while the differences will be described in greater detail below, similar configurations will not be described in the interest of conciseness. As shown in FIG. 8, the stator plate 16 has opening edge parts 16c, which are portions of the stator plate 16 adjacent the opening. In contrast to the side edge parts 16b of the first embodiments, the opening edge parts 16c of the plate body 16a do not protrude radially inward about a projected inner circumferential surface of the body 16a. Instead, when the stator plate 16 is in a disassembled state, the inner diameter (e.g., cross-sectional length) from each of the opening edge parts 16c to an opposite portion of the body 16a has approximately the same the inner diameter as another portion of the plate body 16a. In some cases, the inner diameter from the opening edge part 16c to the body 16a is approximately the same as the flange outer diameter Db, or may be slightly smaller. However, due to manufacturing errors or the like, the inner diameter from the opening edge part 16c to the body 16a may in fact be larger than the flange outer diameter Db.

To help mitigate the issues caused by the manufacturing errors or the like, the body of the auxiliary magnetic member may be structure with an attached projection. For example, if spaces S are formed between the opening edge parts 16c and the flanges 32, 33, 34 of the stator 12 (for example between the flanges 32, 33, 34 and the projected inner circumferential surface of the stator plate 16), a projection may be attached to the body of the auxiliary magnetic member, the projection being configured to at least partially fill the space S. For example, an intervening member may be provided in each of the spaces S. In this embodiment, the intervening member is structured in the form of fillers 52. The fillers 52 may be made from an adhesive, curable filler, vibration dampening material, or the like. Each of the fillers 52 is placed between the corresponding opening edge part 16c and the flanges 32, 33, 34 so as to partially or fully fill the spaces S.

In some instances of the second embodiment, the filler 52 may be inserted into the spaces S after the stator plate 16 has been mated with the flanges 32, 33, 34. By applying the filler 52 after the mating, the amount of filler 52 may be adjusted to accommodate the various sized spaces S that may be formed due to manufacturing errors of the like. Additionally, the amount of filler 52 may be adjusted if pressuring bonding is used, thereby avoiding unnecessary overflow and material wastage.

In some other instances, the filler 52 positioned on either the stator plate 16 or the flanges 32, 33, 34 before mating. More specifically, the filler 52 may be positioned in a location so as to at least partially fill spaces S that may be formed due to manufacturing errors or the like when the stator plate 16 and the flanges 32, 33, 34 are mated. In some instances, the filler 52 will be positioned so as to be most effective in reducing the amount of noise generated by vibrations, while reducing the amount of filler 52 required. For instance, the filler 52 may be positioned towards an opening side of the opening edge part 16c. However, if the filler 52 is made of a curable material and pressure bonding is to be used when curing the filler 52, the filler 52 may be positioned so as to reduce the amount of material that would exit (overflow from) the space S when pressure bonding. Alternatively, the filler 52 may be formed or cured before the stator plate 16 and the flanges 32, 33, 34 are mated.

In some further instances, the intervening member may be formed as a projection attached to one or both opening edge parts 16c. For example, projections may be attached to each of the opening edge parts 16c. These projections are structured and attached to the opening edge parts 16c so that at least a portion of the projection is positioned radially inward from a projected inner circumferential surface of the body 16a. When the stator plate 16 is mated with the flanges 32, 33, 34, the projection abuts the flanges 32, 33, 34.

According to the second embodiment, the fillers 52 prevent the opening edge parts 16c of the stator plate 16 from coming into direct contact with the flanges 32, 33, 34. Thus, noise generated when cycling the supply of the power to the coils 22 can be reduced or prevented. Further, dimensional errors between the flanges 32, 33, 34 of the stator 12 and the stator plate 16 due to manufacturing errors or the like do not cause any problems. The necessary dimensional accuracy required when manufacturing the flanges 32, 33, 34 and the stator plate 16 can be reduced. Thus, the dimensional control of the flanges 32, 33, 34 and the stator plate 16 can be simplified. Further, new manufacturing equipment, additional manufacturing steps, or new designs may not be needed for producing the stator plate 16.

Additionally, it is easy from a manufacturing standpoint to fill the spaces S between the opening edge parts 16b of the stator plate 16 and the flanges 32, 33, 34 of the stator 12 with the fillers 52.

Figure 9:
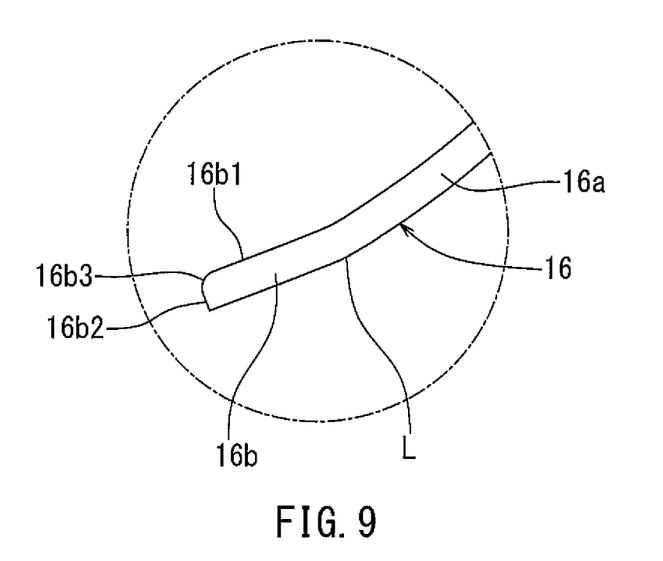
FIG. 9 is an enlarged plan, end view of a side edge of a stator plate according to a third embodiment.

A third embodiment will be described. The third embodiment corresponds to the first embodiment, with some exemplary changes to the side edge parts 16b of the stator plate 16. Thus, while the changes will be described, same configurations will not be described in the interest of conciseness. As shown in FIG. 9, each of the side edge parts 16b (one of which is shown in FIG. 9) includes a chamfer part 16b3 having a straight or rounded shape between an inward facing surface 16b1 and circumferentially facing end surface 16b2 of the side edge part 16b. Each chamfer part 16b3 may be shaped by press-molding or the like.

According to the third embodiment, collision of the outer circumferential surfaces of the flanges 32, 33, 34 of the stator 12 with a pointed corner of the side edge parts 16b of the stator plate 16 is reduced, thereby reducing possible damage to the flanges 32, 33, 34.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure.

For example, the stepping motor 10 may be used for driving sources of various devices other than the above described flow control valve. That is, the movable member coupled with the rotor shaft 35 is not limited to the valve body 46, and may be another reciprocating member moving in the axial direction of the rotor shaft 35 or a rotation member integrally fixed on the rotor shaft 35, such as gear, arm, cam, or the like.

The filler 52 may be provided between at least one of the opening edge parts 16c of the stator plate 16 and at least one of the flanges 32, 33, 34 of the stator 12. The intervening member may be made from elastic member, such as rubber or sponge-like foamed resin, or non-elastic member having high rigidity, such as metal or cured resin. The non-elastic member as the intervening member may be attached to the opening edge parts 16c of the stator plate 16 by adhesion or the like. Each of the chamfer parts 16b3 may have a chamfer plane instead of the round surface. The chamfer parts 16b3 may be formed by bending the side edge parts 16b by press-molding or the like.

What is claimed is:

1. A stepping motor, comprising:
a stator, including:
a bobbin provided with a yoke;
a coil winding around the bobbin; and
an annular flange having an outer diameter larger than an outer diameter of the coil;
a rotor, including:
a rotor shaft rotatably supported by the stator; and
a plurality of magnets arranged around the rotor shaft; and
an auxiliary magnetic member elastically mounted around the flange of the stator,
wherein the auxiliary magnetic member includes:
a body having a central axis, a first end, a second end axially opposite the first end, and an opening extending from the first end to the second end,
wherein the opening defines side edge parts at both circumferential ends of the body, and
wherein the opening is positioned between the side edge parts such that the side edge parts face each other across the opening,
wherein one of the side edge parts comprises a projecting part protruding radially inward from a projected inner circumferential surface extended along an inner circumferential surface of the body across the opening; and
wherein the projecting part extends axially along the corresponding one of the side edge parts from the first end of the to the second end of the body.

2. The stepping motor according to claim 1, wherein the auxiliary magnetic member includes a bend between the body and the side edge part.

3. The stepping motor according to claim 1, wherein the side edge part with the projecting part includes a chamfer part between an inward facing surface and a circumferential facing surface of the side edge part.

4. The stepping motor according to claim 1,
wherein the bobbin includes a terminal connected to the coil and a support part supporting the terminal; and
wherein the terminal protrudes from the support part in a direction parallel to a rotation axis of the rotor shaft.

5. The stepping motor according to claim 1,
wherein the body of the auxiliary magnetic member includes opening parts axially facing at both the first end and the second end thereof.

6. The stepping motor according to claim 1, wherein:
the stator includes at least one additional flange having an outer diameter larger than the outer diameter of the coil;
the flange and the at least one additional flange are aligned in an axial direction of the flange and form a row of flanges; and
the projecting part abuts on one of the flange and the at least one additional flange at each end of the row of flanges.

7. A stepping motor, comprising:
a stator, including:
a bobbin provided with a yoke;
a coil winding around the bobbin; and
an annular flange having an outer diameter larger than an outer diameter of the coil;
a rotor, including:
a rotor shaft rotatably supported by the stator; and
a plurality of magnets arranged around the rotor shaft;
an auxiliary magnetic member elastically mounted around the flange of the stator,
wherein the auxiliary magnetic member includes:
a body having a central axis, a first end, a second end axially opposite the first end, and an opening extending from the first end to the second end,
wherein the opening defines opening edge parts at both circumferential ends of the body, and
wherein the opening is positioned between the opening edge parts such that the opening edge parts face each other across the opening; and
an intervening member interposed between one of the opening edge parts and the flange of the stator, wherein the intervening member extends along the corresponding one of the opening edge parts from the first end to the second end of the body.

8. The stepping motor according to claim 7, wherein the intervening member adheres directly one of the opening edge parts or the flange of the stator.

9. The stepping motor according to claim 7,
wherein the bobbin includes a terminal connected to the coil and a support part supporting the terminal; and
wherein the terminal protrudes from the support part in a direction parallel to a rotation axis of the rotor shaft.

10. The stepping motor according to claim 7,
wherein the body of the auxiliary magnetic member includes opening parts axially facing at both the first end and the second end thereof.

11. The stepping motor according to claim 7, wherein:
the stator includes at least one additional flange having an outer diameter larger than the outer diameter of the coil;
the flange and the at least one additional flange are aligned in an axial direction of the flange and form a row of flanges; and
the intervening member abuts on one of the flange and the at least one additional flange at each end of the row of flanges.

12. A stepping motor, comprising:
a stator having a first flange;
an auxiliary magnetic member mounted around the first flange, wherein the auxiliary magnetic member includes:
a body having a central axis, a first end, a second end axially opposite the first end, and an opening extending from the first end to the second end, wherein the body has a projected inner circumferential surface extending across the opening at circumferential ends of the auxiliary magnetic member; and a projection connected to the body of the auxiliary magnetic member, wherein the projection extends along the body from the first end to the second end of the body;

wherein at least a portion of the projection is positioned radially inward from the projected inner circumferential surface of the body.

13. The stepping motor according to claim 12, wherein the projection is a side edge part of the auxiliary magnetic member, the side edge part being adjacent to a bend in the auxiliary magnetic member.

14. The stepping motor according to claim 13, wherein:

the stator further comprises a second flange, and the portion of the projection that is positioned radially inward from the projected inner circumferential surface of the body has a thickness in a radial direction equal to or greater than a difference in diameter between the first flange and the second flange.

15. The stepping motor of claim 13, wherein an inner circumferential diameter between the bend and the body is greater than an inner circumferential diameter between the projection and the body.

16. The stepping motor according to claim 13, wherein the side edge part includes a chamfer part between an inward facing surface and a circumferential facing surface of the side edge part.

17. The stepping motor according to claim 12, wherein the portion of the projection that is positioned radially inward from the projected inner circumferential surface of the body has a thickness in a radial direction that is thinner than a thickness of the auxiliary magnetic member in the radial direction.

18. The stepping motor according to claim 12, wherein the stator includes a support part and an electric terminal protruding from the support part in a direction parallel to the central axis of the body.

19. The stepping motor according to claim 12, wherein the body of the auxiliary magnetic member includes opening parts axially facing at both the first end and the second end thereof.

20. The stepping motor according to claim 12, wherein:

the stator includes at least one second flange aligned with the first flange in a direction parallel to the central axis of the body such that the first flange and the at least one second flange form a row of flanges; and the at least the portion of the projection abuts on one of the first flange and the at least one second flange at each end of the row of flanges.

* * * * *